(12) United States Patent
Chen et al.

(10) Patent No.: US 6,712,659 B2
(45) Date of Patent: Mar. 30, 2004

(54) APPARATUS AND METHOD FOR PRESSING AND COMBINING TWO SUBSTRATES OF A LCD PANEL

(75) Inventors: Li-Yi Chen, Nantou Hsien (TW); GowZin Yiu, Ilan Hsien (TW)

(73) Assignee: Hannstar Display Corp., Taipei (TW)

( * ) Notice: Subject to any disclaimer, the term of this patent is extended or adjusted under 35 U.S.C. 154(b) by 485 days.

(21) Appl. No.: 09/902,868

(22) Filed: Jul. 10, 2001

(65) Prior Publication Data

US 2002/0047983 A1 Apr. 25, 2002

(30) Foreign Application Priority Data

Aug. 31, 2000 (TW) ........................... 89117745 A

(51) Int. Cl.$^7$ ................................. H01J 9/26
(52) U.S. Cl. ..................... 445/3 R; 445/25; 445/63; 445/66; 156/64
(58) Field of Search ............... 445/3 R, 4, 63, 445/25, 66; 156/64

(56) References Cited

U.S. PATENT DOCUMENTS 5,375,003 A * 12/1994 Hirai ........................... 445/24
6,254,449 B1 * 7/2001 Nakanishi et al. ............ 445/25
2002/0039870 A1 * 4/2002 Kaneko et al. ................. 445/3

* cited by examiner

*Primary Examiner*—Kenneth J. Ramsey
(74) *Attorney, Agent, or Firm*—Thomas, Kayden, Horstemeyer & Risley

(57) ABSTRACT

A method for controlling gap widths of a cell gap of an LCD panel and a relevant apparatus are provided. When a front substrate and a rear substrate of an LCD panel are being pressed to combine together before a sealant between hardens, gap widths at several measured points located on the front or rear substrate are monitored to provide a reference for modifying a parameter distribution, thereby fine-tuning the gap widths. Therefore, gap widths, equivalent to the uniformity of the cell gap, can meet the manufacturer's requirement, and LCD panel yields are increased.

16 Claims, 3 Drawing Sheets

APPARATUS AND METHOD FOR PRESSING AND COMBINING TWO SUBSTRATES OF A LCD PANEL

BACKGROUND OF THE INVENTION

1. Field of the Invention

The present invention relates to an apparatus and a method for pressing and combining two substrates of an LCD (liquid crystal display) panel. In particular, the present invention relates to an apparatus and a method for improving the uniformity of gap width between the two substrates.

2. Description of the Related Art

In general, an LCD panel has two substrates, one front and one rear, having electrodes and a liquid crystal layer between the two substrates combined by a sealant.

After processing the front substrate and the rear substrate and forming electrodes on the inner surfaces of the two substrates, spacers (not shown) are dispersed on the inner surfaces of one of the substrates. A sealant (not shown) having an injection hole is printed on the inner surface of one of the substrates near the edge of the substrates. Next, the two substrates are combined with each other through hot press process, and the spacers give a cell gap between the two substrates. A liquid crystal material is injected into the cell gap to form a liquid crystal layer. Finally, the cell is completed by filling up the injection hole with a sealant.

The gap widths at different locations of the cell gap influence the intensity of the electric fields between electrodes when the liquid crystal cell is supplied with electric power, and will, subsequently, affect the performance of the liquid crystal cell. The electric fields must be both uniform and within an acceptable range. Therefore, manufacturers must generate not only a cell gap with an acceptable range, but also well-controlled uniformity.

A conventional method for hot press provides a uniform pressure distribution to press the two substrates and uniform heating power distribution to harden the sealant combining the two substrates. The simple hypothesis of this method is that a uniform control parameter distribution introduces a uniform cell gap. FIG. 1 illustrates the operation of a conventional hot press process. The front substrate 10 and the rear substrate 12 are going to be combined. A pressure plate 16 and a platform 14 uniformly press and heat the two substrates until the sealant between is hardened, thereby obtaining a cell gap with an excellent uniformity.

In fact, however, the hypothesis of the convention method rarely holds in practice. The sealant, for example, may have tiny quality or quantity variations in different places, as may the spacers. Even the substrates may have uneven surfaces. Therefore, though pressure and heating distribution on the substrates may be uniform, the cell gap may not be uniform enough, producing a faulty LCD panel.

SUMMARY OF THE INVENTION

Therefore, an object of the present invention is to optimize the uniformity of a cell gap by, during pressing, monitoring the gap width distribution and modifying process parameters to fine-tune the cell gap.

An aspect of the present invention provides a method for controlling gap widths. This method is applied during the combining of the first and second substrates. The first substrate has a plurality of measured points. The gap widths lie between the first and second substrates at the measured points. The first step of the method is to provide a control parameter distribution for pressing and combining the first and second substrates. The second step of the method is to measure, during pressing and combining of the first and second substrates, the gap widths. The final step of the method is to modify, when the gap widths don't meet a predetermined requirement, the control parameter distribution to adjust the gap widths.

Another aspect of the present invention provides an apparatus for pressing and combining first and second substrates. The apparatus comprises a controller, a pressing means and a monitoring means. The controller controls parameter distribution. The pressing means, according to the parameter distribution, presses and combines the first substrate and the second substrate. The monitoring means measures gap widths between the first substrate and the second substrate, each gap width corresponding to one of measured points on the first substrate. When the gap widths don't meet a predetermined requirement, the controller changes the parameter distribution and, subsequently, modifies the gap widths.

The parameter distribution can be any parameter distribution that controls the hot press process, such as temperature distribution, pressure distribution, heating power distribution, or others.

The predetermined requirement can be any product requirement that the gap widths must meet. The requirement of uniformity of the cell gap is selected as an example.

The benefits of the present invention include the improvement of uniformity of the cell gap. During pressing of the two substrates, gap widths at measured points are monitored and fed back to modify parameter distribution, thereby turning out a cell gap with excellent uniformity. By such a feedback algorithm, the stability and the uniformity of the cell gap can be optimized.

DETAILED DESCRIPTION OF THE PREFERRED EMBODIMENT

The essence of the present invention is to provide a feedback algorithm for pressing/combining a front substrate and a rear substrate. When a front substrate and a rear substrate are pressed together before the sealant between them hardens, gap widths at several measured points located on the front or rear substrate are monitored to provide a reference for modifying a controllable parameter distribution, thereby fine tuning the gap widths. Thus, the gap widths, equivalent to the uniformity of the cell gap, meet the manufacturing requirement, and the yield of LCD panels is improved.

Figure 1:
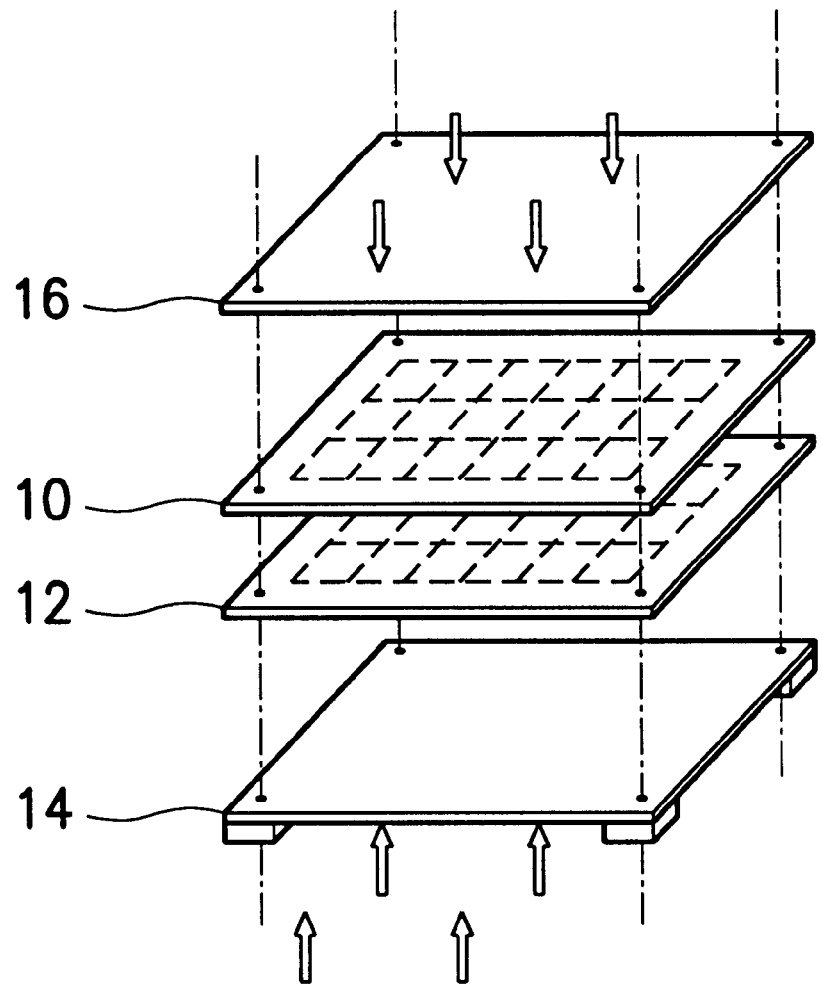
FIG. 1 illustrates the operation of a conventional hot press process.
Figure 2:
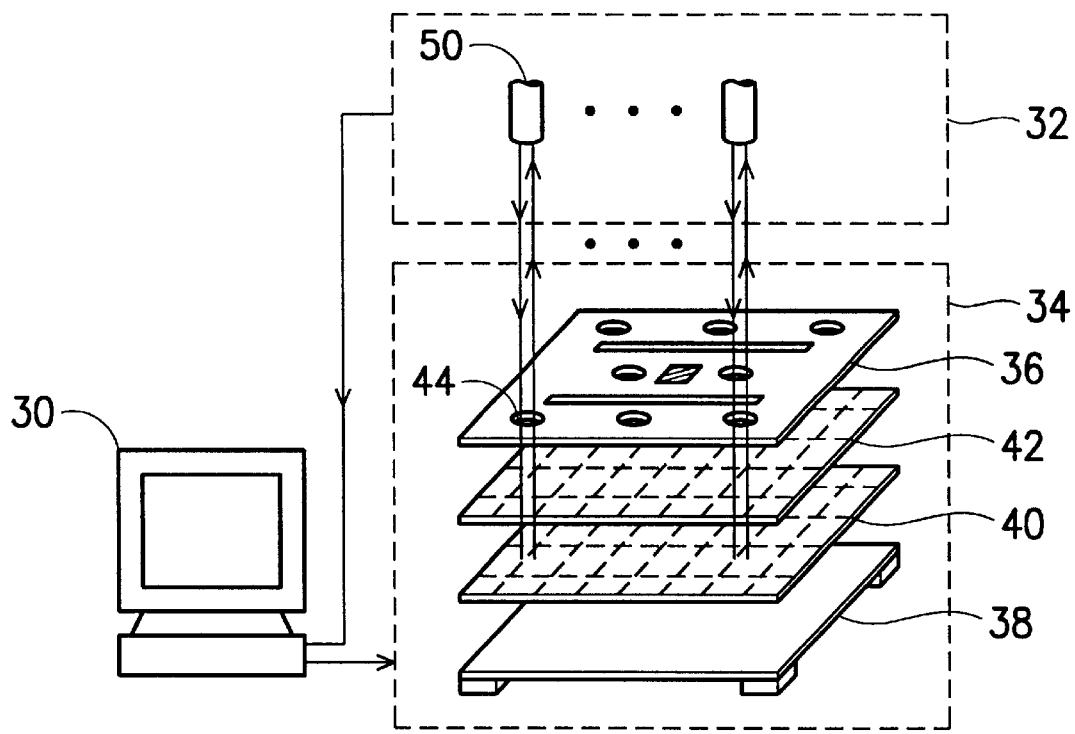
FIG. 2 is a schematic illustration of a pressing apparatus according to the present invention.

FIG. 2 is a schematic illustration of a pressing apparatus according to the present invention. The pressing apparatus has a controller 30, a monitor means 32, and a press means 34.

The controller 30, such as a computer, controls several process parameters, for example, heating power rate, the pressure for combining the two substrates (42 and 40), the pressing time duration for combining, and other parameters, to expedite the hot press process. Among these parameters, pressure distribution applied to the two substrates (42 and 40) during the hot press process is selected to demonstrate an embodiment of the present invention.

The purpose of the press means 34 is to physically press and combine the front substrate 42 and the rear substrate 40, as well as to heat these two substrates. The press means 34 has a press plate 34 and a platform 38. On the platform 38, the front substrate 42 overlaps the rear substrate 40 and is pressed by the press plate 34 to effect the hot press process. The press plate 34 has several transparent apertures 44 located above measured points on the front substrates 42.

The purpose of the monitor means 32 is to monitor the gap widths at the measured points as collected data, and to feed the collected data back to the controller 30.

The collected data, the gap widths, express the uniformity of the cell gap between the front substrate 42 and the rear substrate 40. If the collected data does not meet the uniformity requirement of the hot press process, the controller 30 can modify the pressure distribution according to the collected data. In other words, a new pressure distribution is generated in the press means 34. If the sealant is not hardened, the new pressure distribution will produce new gap widths. Then, these new gap widths will be sensed by the monitor means 32 and are fed again to the controller 30. The detection performed by the monitor means 32 and the modification induced by the controller 30 construct a loop, which continuously works as long as the sensed gap widths are outside uniformity requirements. If the loop runs over a certain time or past the period for the sealant to begin hardening, a warning can be raised to alert. Once the uniformity requirement is met, the loop is stopped, and instant pressure distribution is held until the sealant is hardened. Thus, a LCD panel with acceptable uniformity is produced.

The monitor means 32 can include several optical interferometers 50, which can measure the tiny gap widths between the two substrates without touching them, to perform the required observation and measurement functions.

Figure 3:
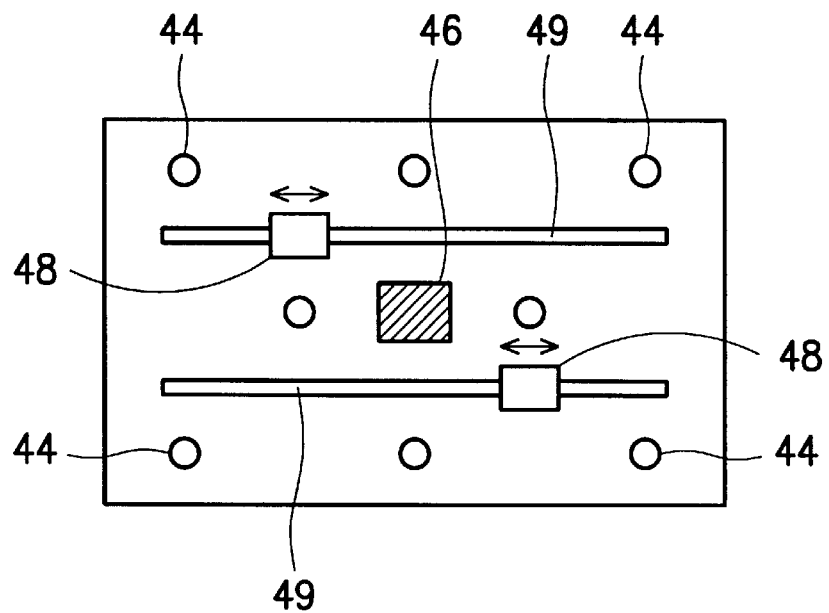
FIG. 3 illustrates the press plate 32 in FIG. 2.

FIG. 3 illustrates the press plate 32 in FIG. 2. If the press plate 32 is mostly opaque material, there must be several transparent apertures 44, as shown in FIG. 3, left such that the laser beams from the optical interferometers 50 can access the measured points. Inside the transparent apertures 44 can be equipped with quartz or fuse silica. In the case of the press plate 32, generally transparent material, the laser beams from the optical interferometers can easily access the cell gap and the transparent apertures 44 in FIG. 3 become unnecessary.

The press plate 36 in FIG. 3 can provide different kinds of pressure distributions. A main arm 46 is fixed at the center of the press plate 36, as shown in FIG. 3, to serve as a major weight provider during the hot press process. Two floating arms 49, which are placed in parallel on the press plate 36 and have two movable sticks 48, serve as two minor weight providers during the hot press process. By varying the location of the movable sticks 48, which provide a minor portion of the weight required, pressure distribution provided by the press plate 36 is adjusted. Furthermore, the weight provided by the main arm 46 is also adjustable. Theoretically, the more the pressure, the less the cell gap.

Figure 4:
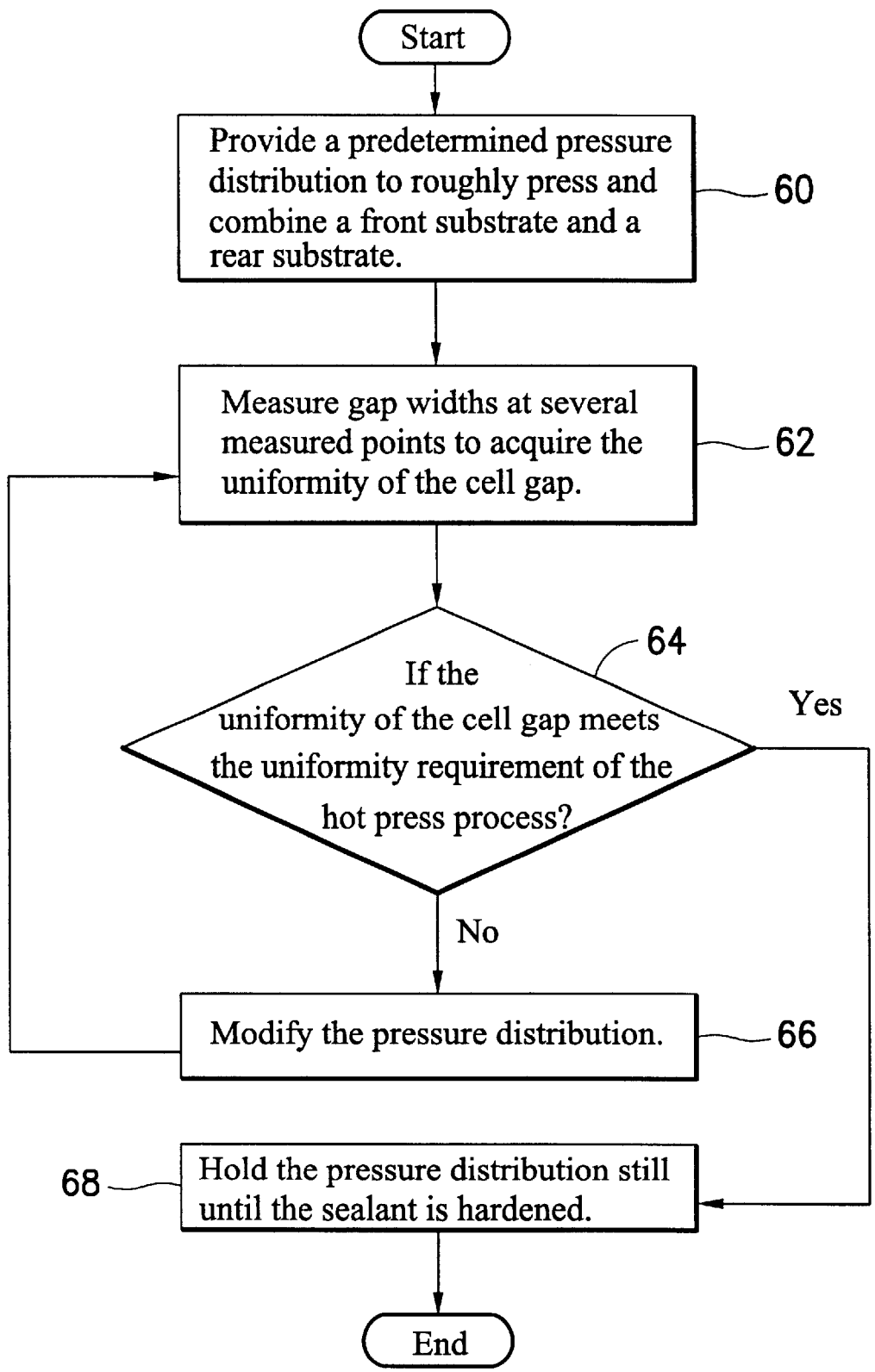
FIG. 4 illustrates a flow chart of the method according to the present invention.

FIG. 4 illustrates a flow chart of the method according to the present invention. First, to begin the hot press process, predetermined pressure distribution is used to roughly combine a front substrate and a rear substrate (symbol 60), and to roughly form a cell gap between them. By measuring gap widths at several measured points, the uniformity of the cell gap can be acquired (symbol 62). If the instant uniformity of the cell gap doesn't meet the uniformity requirement of the hot press process (the no route in symbol 64), the pressure distribution is modified according to the instant uniformity in company with a look-up table or a calculation algorithm (symbol 66) and, subsequently, the operation in symbol 62 is executed. Only when the uniformity of the cell gap meets the uniformity requirement (the yes route of symbol 60) is the pressure distribution held still until the sealant is hardened (symbol 68). Accordingly, the uniformity of the cell gap is always well controlled, producing an acceptable result.

In addition to the pressure distribution, there are many process parameters affecting the uniformity of the cell gap. For example, UV-light intensity distribution, temperature distribution and heat distribution on the front/rear substrate. Thus, the present invention utilizes the modification of these parameters instead of the modification of the pressure distribution.

The advantages of the present invention include:
1. Excellent uniformity: Since the uniformity of the cell gap is always monitored and modified during heating of the sealant.
2. Process repetition: Even though some parts of the hot press tool may be aging or worn out, each LCD panel passing the process of the hot press tool without warning can be considered as an LCD panel with excellent uniformity.
3. Cost saving: The warning can be raised the first time the cell gap of an LCD is not uniform, thereby the decision of whether to continue subsequent processes can be made immediately, to avoid counterproductive process runs.

In comparison with the prior art, whose method utilizes uniform process parameters and expects that a cell gap with good uniformity will be obtained, the present invention provides a method of monitoring the cell gap during the hot press process, while modifying a process parameter to adjust the cell gap. Therefore, under the control of the present invention, several benefits, such as excellent uniformity, process repetition and cost saving, are achieved.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling gap widths, applied during the combining of a first substrate and a second substrate, the first substrate having a plurality of measured points, the gap widths lying between the first and second substrates at the measured points, the method comprising:

providing a parameter distribution for pressing and combining the first and second substrates;

measuring, during pressing and combining the first and second substrates, the gap widths; and modifying, when the gap widths don't meet a predetermined requirement, the parameter distribution to adjust the gap widths.

2. The method as claimed in claim 1, wherein the first and second substrates are the front and rear substrates of an LCD panel.

3. The method as claimed in claim 1, wherein the parameter distribution is pressure distribution, temperature distribution or heat distribution on the first substrate.

4. The method as claimed in claim 1, wherein the gap widths are measured by light interference measurement.

5. The method as claimed in claim 1, wherein the predetermined requirement is a uniformity requirement or an acceptable range of the gap widths.

6. A apparatus for pressing and combining a first substrate and a second substrate, comprising:

a controller for controlling a parameter distribution;

a pressing means controlled by the parameter distribution to press and combine the first and second substrates; and a monitoring means for measuring gap widths between the first and the second substrates, each gap width corresponding to one of measured points on the first substrate;

wherein, when the gap widths don't meet a predetermined requirement, the controller changes the parameter distribution and, subsequently, modifies the gap widths.

7. The apparatus as claimed in claim 6, wherein the first and second substrates are the front and rear substrates of an LCD panel.

8. The apparatus as claimed in claim 6, wherein the pressing means has a pressure plate and a platform for respectively pressing the first and second substrates to combine the first substrate and the second substrate together.

9. The apparatus as claimed in claim 8, wherein the pressure plate is made of opaque material and has transparent apertures corresponding to the measured points on the first substrate.

10. The apparatus as claimed in claim 8, wherein the pressure plate is made of transparent material.

11. The apparatus as claimed in claim 8, wherein the pressure plate includes a main, fixed arm for providing the majority of pressure distribution and a floating arm for adjusting pressure distribution.

12. The apparatus as claimed in claim 6, wherein the monitoring means comprises a plurality of interferometers.

13. The apparatus as claimed in claim 6, wherein the parameter distribution is pressure distribution on the first substrate.

14. The apparatus as claimed in claim 6, wherein the parameter distribution is temperature distribution on the first substrate.

15. The apparatus as claimed in claim 6, wherein the parameter distribution is heating power distribution on the first substrate.

16. The apparatus as claimed in claim 6, wherein the parameter distribution is UV-light intensity distribution on the first substrate.

* * * * *